(12) United States Patent
Hou et al.

(10) Patent No.: US 11,108,438 B2
(45) Date of Patent: Aug. 31, 2021

(54) METHOD AND APPARATUS FOR PROCESSING UPLINK FREQUENCY SHIFT OF COMMUNICATION SYSTEM

(71) Applicant: ZTE CORPORATION, Shenzhen (CN)

(72) Inventors: Xiaohui Hou, Shenzhen (CN); Feng Yang, Shenzhen (CN); Qinbo Lu, Shenzhen (CN)

(73) Assignee: XI'AN ZHONGXING NEW SOFTWARE CO., LTD.

( * ) Notice: Subject to any disclaimer, the term of this patent is extended or adjusted under 35 U.S.C. 154(b) by 0 days.

(21) Appl. No.: 16/614,825

(22) PCT Filed: Jun. 1, 2018

(86) PCT No.: PCT/CN2018/089489
§ 371 (c)(1),
(2) Date: Nov. 19, 2019

(87) PCT Pub. No.: WO2018/223897
PCT Pub. Date: Dec. 13, 2018

(65) Prior Publication Data
US 2020/0204217 A1    Jun. 25, 2020

(30) Foreign Application Priority Data
Jun. 6, 2017   (CN) .......................... 201710417979.6

(51) Int. Cl.
*H04B 7/01* (2006.01)
*H04L 27/00* (2006.01)
*H04W 72/04* (2009.01)

(52) U.S. Cl.
CPC ........... *H04B 7/01* (2013.01); *H04L 27/0014* (2013.01); *H04W 72/0446* (2013.01); *H04W 72/0453* (2013.01); *H04L 2027/0026* (2013.01)

(58) Field of Classification Search
CPC .. H04B 7/01; H04L 27/0014; H04W 72/0446; H04W 72/0453
See application file for complete search history.

(56) References Cited

U.S. PATENT DOCUMENTS

| | | | |
|---|---|---|---|
| 2005/0232338 A1* | 10/2005 | Ziedan | ................ H04B 1/69 |
| 2010/0067634 A1 | 3/2010 | Furman et al. | |
| 2019/0222302 A1* | 7/2019 | Lin | ................ H04B 7/185 |

FOREIGN PATENT DOCUMENTS

| | | |
|---|---|---|
| CN | 101604990 A | 12/2009 |
| CN | 101902774 A | 12/2010 |

(Continued)

OTHER PUBLICATIONS

International Search Report and Written Opinion Form PCT/ISA/210 and PCT/ISA237, International Application No. PCT/CN2018/089489, p. 1-6, International Filing Date Jun. 1, 2018, dated search report Aug. 24, 2018.

(Continued)

*Primary Examiner* — Roland B Abelson
(74) *Attorney, Agent, or Firm* — George R. McGuire; Bond Schoeneck & King, PLLC

(57) ABSTRACT

Disclosed are a method and apparatus for processing an uplink frequency offset of a communication system. The method on a base station side includes: demodulating a random access message sent by a terminal to obtain an initial Doppler frequency offset of the terminal and delivering the initial Doppler frequency offset to the terminal; receiving an uplink subframe signal sent by the terminal, estimating a residual Doppler frequency offset of the terminal on an uplink, obtaining a frequency retuning amount according to the residual Doppler frequency offset and delivering the frequency retuning amount to the terminal. The method on a terminal side includes: receiving an initial Doppler frequency offset sent by a base station, obtaining an initial (Continued)

uplink transmission frequency according to an initial downlink transmission frequency and the initial Doppler frequency offset and sending an uplink subframe signal; and receiving a frequency retuning amount sent by the base station, and obtaining a transmission frequency of a next uplink transmission according to the frequency retuning amount.

18 Claims, 5 Drawing Sheets

(56) References Cited

FOREIGN PATENT DOCUMENTS

| | | |
|---|---|---|
| WO | 2017072745 A1 | 5/2017 |
| WO | 2017080681 A1 | 5/2017 |

OTHER PUBLICATIONS

"GEO-Mobile Radio Interface Specifications (Release 3); Third Generation Satellite Packet Radio Service; Part 5: Radio interface physical layer specifications; Sub-part 7: Radio Subsystem Synchronization; GMR-1 3G 45.010", Technical Specification, European Telecommunications Standards Institute (ETSI), 650, Route Des Lucioles; F-06921 Sophia-Antipolis; France, vol. SES SCN, No. V3.3.1, Dec. 1, 2012 (Dec. 1, 2012), XP014092665, *pp. 28-34*.

Supplemental European Search Report EP 18 81 4035, dated Feb. 9, 2021.

\* cited by examiner

METHOD AND APPARATUS FOR PROCESSING UPLINK FREQUENCY SHIFT OF COMMUNICATION SYSTEM

CROSS REFERENCE TO RELATED APPLICATIONS

This is a U.S. National Stage Application, filed under 35 U.S.C. 371, of International Patent Application No. PCT/CN2018/089489, filed on Jun. 1, 2018, which claims priority to Chinese patent application No. 201710417979.6 filed on Jun. 6, 2017, contents of both of which are incorporated herein by reference in their entireties.

TECHNICAL FIELD

The present disclosure relates to the field of communications, for example, to a method and apparatus for processing an uplink frequency offset of a communication system.

BACKGROUND

When a User Equipment (UE) moves at a high speed, a frequency offset is introduced in the downlink and uplink of the wireless communication, and the higher the speed, the larger the frequency offset. According to the current communication mechanism of the UE and the base station, the UE locks the downlink transmission frequency point $f_{DL}$ of the base station in the downlink. Actually the UE is always moving, the actually locked downlink transmission frequency of the base station is $f_{DL}+\Delta$ by considering the influence of the Doppler frequency offset, and then the reference frequency point of the uplink transmission is determined based on this.

For Frequency Division Dual (FDD), the uplink transmission frequency point is $f_{UL}=f_{DL}+\Delta+\beta$, where $\Delta$ is the Doppler Frequency offset, $\beta$ is the duplex spacing. For Time Division Duplexing (TDD), the uplink transmission frequency point is $f_{UL}=f_{DL}+\Delta$.

The UE is still in the mobile state during uplink communication. For FDD, the moving speed and the moving angle relative to the base station in the downlink is consistent with the moving state on the uplink. Even for TDD, in the millisecond level, mobile states on the uplink and the downlink are almost completely consistent. Therefore, when the base station receives the signal of the UE, the Doppler frequency offset of the uplink still needs to be considered.

Therefore, the frequency point of the uplink transmission signal of the UE actually received by the base station is $f_{UL}^{Base\ station}=f_{DL}+2\Delta+\beta$ for FDD, and is $f_{UL}^{Base\ station}=f_{DL}+2\Delta$ for TDD.

Apparently, when the UE moves at a high speed, the UE needs only to process the Doppler frequency offset, while the receiver of the base station needs to process two times the Doppler frequency offset, so that the demodulation pressure of the receiver of the base station is greater than that of the UE. However, in the related art, an inaccurate estimation of the Doppler frequency offset cannot be avoided in the process of solving the problem that the demodulation pressure of the receiver of the base station is greater than that of the UE.

SUMMARY

The present disclosure provides a method and apparatus for processing an uplink frequency offset of a communication system.

The present disclosure provides a method for processing an uplink frequency offset of a communication system. The method is applied to a base station and includes: demodulating a random access message sent by a terminal to obtain an initial Doppler frequency offset of the terminal; delivering the initial Doppler frequency offset to the terminal; receiving an uplink subframe signal sent by the terminal, estimating a residual Doppler frequency offset of the terminal on an uplink, and obtaining a frequency retuning amount according to the residual Doppler frequency offset; and delivering the frequency retuning amount to the terminal.

The present disclosure provides a method for processing an uplink frequency offset of a communication system. The method is applied to a terminal and includes: after sending a random access message to a base station, receiving an initial Doppler frequency offset sent by the base station; locking an initial downlink transmission frequency, and obtaining an initial uplink transmission frequency according to the initial downlink transmission frequency and the initial Doppler frequency offset; sending an uplink subframe signal to the base station according to the initial uplink transmission frequency; and receiving a frequency retuning amount sent by the base station, obtaining a transmission frequency of a next uplink transmission according to the frequency retuning amount, and sending the uplink subframe signal to the base station.

The present disclosure provides an apparatus for processing an uplink frequency offset of a communication system. The apparatus is applied to a base station and includes a frequency offset estimation module and a delivery module.

The frequency offset estimation module is configured to demodulate a random access message sent by a terminal to obtain an initial Doppler frequency offset of the terminal.

The delivery module is configured to deliver the initial Doppler frequency offset to the terminal.

The frequency offset estimation module is further configured to receive an uplink subframe signal sent by the terminal, estimate a residual Doppler frequency offset of the terminal on an uplink, and obtain a frequency retuning amount according to the residual Doppler frequency offset.

The delivery module is further configured to deliver the frequency retuning amount to the terminal.

The present disclosure provides an apparatus for processing an uplink frequency offset of a communication system. The apparatus is applied to a terminal and includes: a sending module, a receiving module, a frequency locking module, and a calculating module.

The sending module is configured to send a random access message to a base station.

The receiving module is configured to receive an initial Doppler frequency offset sent by the base station.

The locking module is configured to lock an initial downlink transmission frequency.

The calculating module is configured to obtain an initial uplink transmission frequency according to the initial downlink transmission frequency and the initial Doppler frequency offset.

The sending module is further configured to send an uplink subframe signal to the base station according to the initial uplink transmission frequency.

The receiving module is further configured to receive a frequency retuning amount sent by the base station.

The calculating module is further configured to obtain a transmission frequency of a next uplink transmission according to the frequency retuning amount.

The sending module is further configured to send the uplink subframe signal to the base station according to the transmission frequency of the next uplink transmission.

The present disclosure has the following beneficial effects.

According to the method and apparatus for processing an uplink frequency offset of a communication system provided by the embodiments of the present disclosure, the base station estimates different frequency offsets of each UE on the uplink, and delivers the retuning amounts of the frequency offset to the respective UEs in the downlink. The UE adjusts the transmission frequency of the uplink according to the retuning amount. The method and apparatus not only solve the problem that the frequency offset estimation is inaccurate since a use of the frequency offset compensation algorithm is beyond the frequency offset estimation capability of the receiver the base station when the Doppler frequency offset is large, and also solves the problem that it is difficult to implement one base station downlink transmission corresponding to multiple UEs reception when the Doppler frequency offset is compensated since the Doppler frequency offsets of different UEs are different because of different moving speeds of different UEs under the base station when the Doppler effect is counteracted by the downlink pre-compensation. The uplink compensation is performed at the transmitter of the UE in the embodiments of the present disclosure, and thus the pressure of performing frequency offset estimation and other processing on the base station side is reduced to the maximum extent, and the demodulation performance of base station reception is improved.

DETAILED DESCRIPTION

At present, two schemes are provided for solving the problem that the demodulation pressure of the receiver of the base station is greater than the demodulation pressure of the UE when the UE moves at a high speed. The first scheme is that the receiver of the base station processes the signal through the frequency offset estimation and a compensation algorithm, and then demodulates the signal. In the second scheme, the Doppler frequency offset 2Δ is eliminated in the downlink signal transmission, and 2× Doppler frequency offset is compensated on the uplink.

In other words, for FDD, the base station transmits at the frequency point $f_{DL}-2\Delta$ in the downlink, and receives at the frequency point $f_{DL}+\beta$ on the uplink.

For TDD, the base station transmits at the frequency point $f_{DL}-2\Delta$ in the downlink, and receives at the frequency point $f_{DL}$ on the uplink.

However, the above two schemes each have some disadvantages. In the first scheme, the frequency offset compensation algorithm is used only in the receiver of the base station. When the Doppler frequency offset is large, the frequency offset estimation is not accurate, and more reference symbols need to be introduced in order to estimate the frequency offset. The second idea is to eliminate Doppler frequency offset in the downlink, but in fact, the moving speeds of different UEs under the base station are different, and the Doppler frequency offsets introduced by the UEs are different. The compensation value for compensating the Doppler frequency offset corresponds to multiple UEs. The present disclosure provides a method and apparatus for processing an uplink frequency offset of a communication system. The present application is further described in detail below with reference to the drawings. It is to be understood that specific embodiments described herein are intended to explain the present disclosure, and not to limit the present disclosure.

Figure 1:
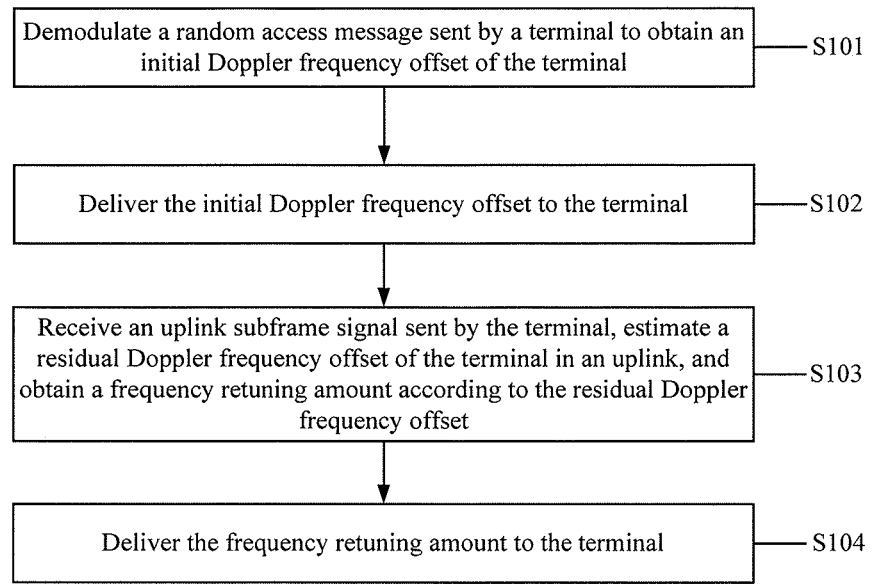
FIG. 1 is a flowchart of a method for processing an uplink frequency offset of a communication system according to an embodiment of the present application.

According to an embodiment of the present disclosure, a method for processing an uplink frequency offset of a communication system is provided, and is applied to a base station. FIG. 1 is a flowchart of a method for processing an uplink frequency offset of a communication system according to an embodiment of the present application. As shown in FIG. 1, the method for processing an uplink frequency offset of a communication system according to the embodiment of the present application includes the steps S101 to S104 described below.

In step S101, a random access message sent by a terminal is demodulated to obtain an initial Doppler frequency offset of the terminal.

In an embodiment, in the initial access stage, a base station demodulates a uplink random access message of the M-th UE, i.e., the UE M in a cell, and then the base station obtains an initial Doppler frequency offset $\Delta_{M,0}$ of the UE M.

In step S102, the initial Doppler frequency offset is delivered to the terminal.

In an embodiment, the initial Doppler frequency offset is delivered to the terminal, so that the terminal retunes an initial uplink transmission frequency according to the initial Doppler frequency offset.

In an embodiment, the base station sends the initial Doppler frequency offset $\Delta_{M,0}$ to the UE M through a multiple access channel (MAC) random access response (MAC RAR).

In step S103, an uplink subframe signal sent by the terminal is received, a residual Doppler frequency offset of the terminal on the uplink is estimated, and a frequency retuning amount is obtained according to the residual Doppler frequency offset.

In an embodiment, the step of obtaining the frequency retuning amount according to the residual Doppler frequency offset includes the steps described below.

The initial Doppler frequency offset is added to the residual Doppler frequency offset to obtain an absolute frequency retuning amount of the terminal.

Alternatively, the residual Doppler frequency offset is used as a relative frequency retuning amount of the terminal.

That is, for the flexibility of the UE to perform frequency offset retuning, an absolute retuning scheme and a relative retuning scheme are adopted. In the absolute retuning, the absolute frequency retuning amount is used as the frequency retuning amount, and in the relative retuning, the relative frequency retuning amount is used as the frequency retuning amount.

The absolute retuning method is as follows: the base station tracks a change of the mobile state of the UE, estimates the residual Doppler frequency offset $\theta_{M,n}$ of the UE Min each subframe, and is responsible for calculating the absolute frequency retuning amount $\Delta_{M,0}+\Delta_{M,n}$ of the UE M.

The relative retuning method is as follows: the base station tracks a change of the mobile state of the UE, and estimates the residual Doppler frequency offset $\theta_{M,n}$ of the UE M in each subframe.

In S104, the frequency retuning amount is delivered to the terminal.

In an embodiment, the frequency retuning amount is delivered to the terminal so that the terminal adjusts the transmission frequency of the next uplink transmission according to the frequency retuning amount.

In an embodiment, the absolute frequency retuning amount is delivered to the UE through the MAC RAR or a frequency retuning command MAC control element; or the residual Doppler frequency offset $\theta_{M,n}$ (also referred to as the relative frequency retuning amount) is sent to the UE through a frequency retuning command MAC control element carried by a MAC PDU.

Figure 2:
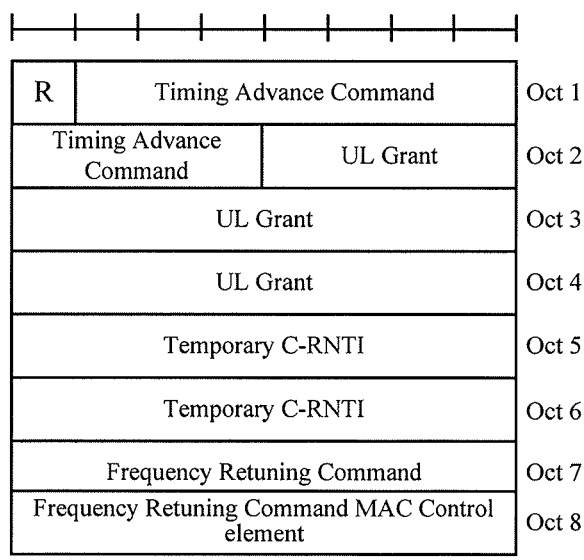
FIG. 2 is a schematic structural diagram of a Multiple Access Channel (MAC) random access response (RAR) according to an embodiment of the present application.
Figure 3:
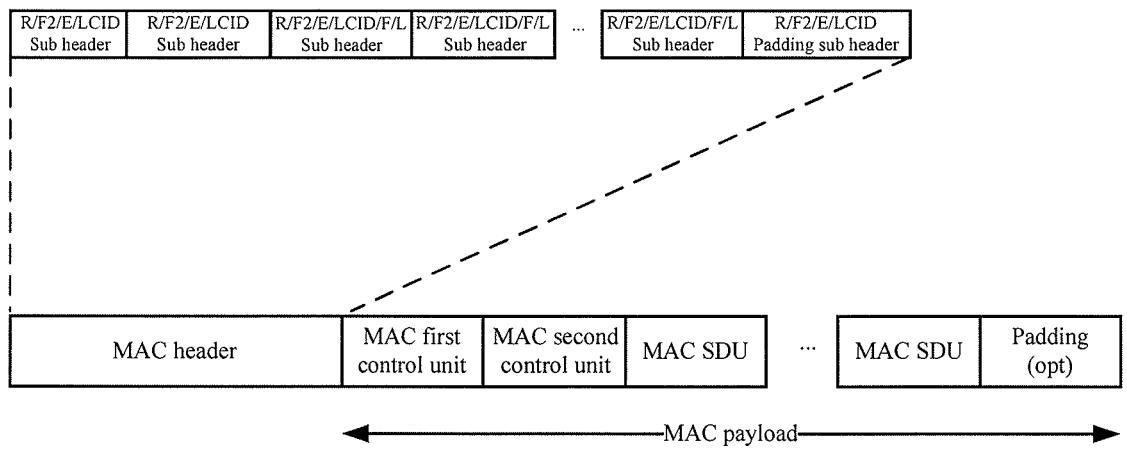
FIG. 3 is a schematic structural diagram of a MAC protocol data unit (PDU) according to an embodiment of the present application.
Figure 4:
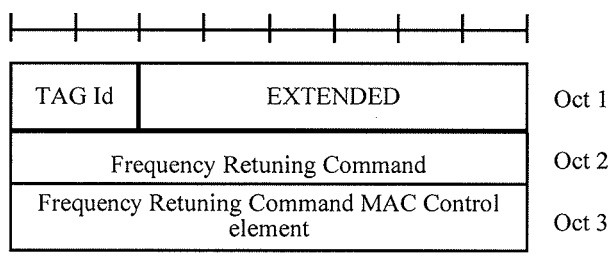
FIG. 4 is a schematic structural diagram of a frequency retuning command MAC control element according to an embodiment of the present application.

The MAC RAR is shown in FIG. 2, the MAC PDU is shown in FIG. 3, the frequency retuning command MAC control element is shown in FIG. 4, and the logical channel identity (LCD) value of the downlink shared channel is shown in Table 1.

TABLE 1

| LCID value of a downlink shared channel | |
|---|---|
| Index | LCID values |
| 0 | Common Control Channel(CCCH) |
| 00001-01010 | Identity of the logical channel |
| 01011 | Frequency Retuning Command |
| 01100-10111 | Reserved |
| 11000 | Activation/Deactivation (4 8octets) |
| 11001 | Single Cell-Multicast Control Channel (SC-MCCH), Single Cell-Multicast Traffic Channel (SC-MTCH) |
| 11010 | Long Discontinuous Reception (DRX) Command |
| 11011 | Activation/Deactivation (1 octet) |
| 11100 | UE Contention Resolution Identity |
| 11101 | Timing Advance Command |
| 11110 | DRX Command |
| 11111 | Padding |

In order to support the solution of an embodiment of the present disclosure, the frequency retuning command and the frequency retuning command MAC control element need to be added into the MAC RAR. The resolution of the Doppler frequency offset is 5 Hz, and thus the frequency offset range represented by 16 bits is (0, 32.7675) kHz.

Figure 5:
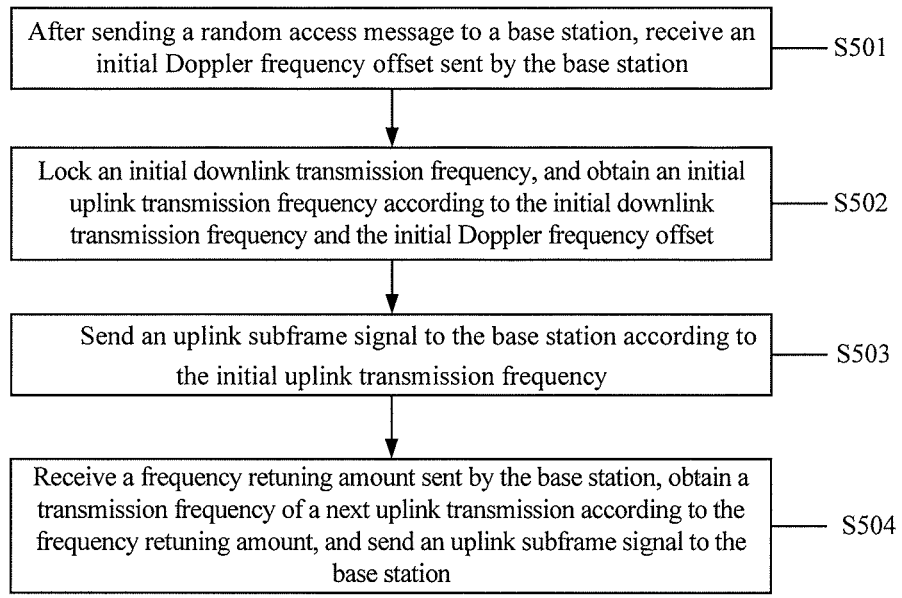
FIG. 5 is a flowchart of a method for processing an uplink frequency offset of a communication system according to another embodiment of the present application.

According to another embodiment of the present disclosure, a method for processing an uplink frequency offset of a communication system is provided, and is applied to a terminal. FIG. 5 is a flowchart of a method for processing an uplink frequency offset of a communication system according to another embodiment of the present application. As shown in FIG. 5, the method for processing an uplink frequency offset of the communication system according to another embodiment of the present disclosure includes the steps S501 to S504 described below.

In step S501, a random access message is sent to a base station, and then an initial Doppler frequency offset sent by the base station is received.

In step S502, an initial downlink transmission frequency is locked, and an initial uplink transmission frequency is obtained according to the initial downlink transmission frequency and the initial Doppler frequency offset.

In an embodiment, the step of obtaining the initial uplink transmission frequency according to the initial downlink transmission frequency and the initial Doppler frequency offset includes the steps described below.

For FDD, the initial downlink transmission frequency, the initial Doppler frequency offset, and a duplex spacing are added together to obtain the initial uplink transmission frequency.

For TDD, the initial downlink transmission frequency and the initial Doppler frequency offset are added together to obtain the initial uplink transmission frequency.

That is, the UE M receives the initial Doppler frequency offset $\Delta_{M,0}$ and locks the downlink transmission frequency $f_{DL}$ of the base station in the initial access phase, and for the FDD system and the TDD system, the UE M calculates the initial uplink transmission frequency $f_{UL}^{M,1}$ according to Equation 1 and Equation 2 respectively. In Equation 1, β denotes the duplex spacing.

$$f_{UL}^{M,1}+f_{DL}+\Delta_{M,0}+\beta \qquad \text{Equation 1;}$$

$$f_{UL}^{M,1}+f_{DL}+\Delta_{M,0} \qquad \text{Equation 2.}$$

In S503, an uplink subframe signal is sent to the base station according to the initial uplink transmission frequency.

In S504, a frequency retuning amount sent by the base station is received; the transmission frequency of the next uplink transmission is obtained according to the frequency retuning amount, and the uplink subframe signal is sent to the base station.

In an embodiment, according to the frequency retuning amount, the transmission frequency of the next uplink transmission is obtained according to the frequency retuning amount, which includes two cases, one is that the frequency retuning amount is an absolute frequency retuning amount and the other one is that the frequency retuning amount is a relative frequency retuning amount.

When the frequency retuning amount is the absolute frequency retuning amount, the step of obtaining the transmission frequency of the next uplink transmission according to the initial downlink transmission frequency and the current absolute frequency retuning amount includes the steps described below.

For FDD, the initial downlink transmission frequency, the current absolute frequency retuning amount, and the duplex spacing are added together to obtain the transmission frequency of the next uplink transmission.

For TDD, the initial downlink transmission frequency and the current absolute frequency retuning amount are added together to obtain the transmission frequency of the next uplink transmission.

That is, the UE M receives the absolute frequency retuning amount, and the UE M calculates, in combination of the initial downlink transmission frequency $f_{DL}$, the transmission frequency of the next uplink transmission $f_{UL}^{M,n+1}$ according to Equation 3 and Equation 4 respectively for FDD and TDD. In Equation 3, β denotes the duplex spacing.

$$f_{UL}^{M,n+1} = f_{DL} + \Delta_{M,0} + \theta_{M,n} + \beta \qquad \text{Equation 3;}$$

$$f_{UL}^{M,n+1} = f_{DL} + \Delta_{M,0} + \theta_{M,n} \qquad \text{Equation 4.}$$

When the frequency retuning amount is the relative frequency retuning amount, the step of obtaining the transmission frequency of the next uplink transmission according to the current downlink transmission frequency and the current relative frequency retuning amount includes the steps described below.

For FDD, the current downlink transmission frequency, the current relative frequency retuning amount, and the duplex spacing are added together to obtain the transmission frequency of the next uplink transmission.

For TDD, the current downlink transmission frequency and the relative frequency retuning amount are added together to obtain the transmission frequency of the next uplink transmission.

That is, the UE M receives the residual Doppler frequency offset $\theta_{M,n}$, and, the UE M calculates, according to the current downlink transmission frequency $f_{DL}^{M,n}$, the transmission frequency $f_{UL}^{M,n+1}$ of the next uplink transmission according to Equation 5 and Equation 6 respectively for FDD and TDD. In Equation 5, β denotes the duplex spacing.

$$f_{UL}^{M,n+1} = f_{DL}^{M,n} + \theta_{M,n} + \beta \qquad \text{Equation 5;}$$

$$f_{UL}^{M,n+1} = f_{DL}^{M,n} + \theta_{M,n} \qquad \text{Equation 6.}$$

The method for processing an uplink frequency offset of a communication system provided by the present application solves two problems. One problem is that the frequency offset compensation algorithm used by the receiver of the base station is beyond the frequency offset estimation capability of the receiver of the base station when the Doppler frequency offset is large, causing inaccurate estimation of the frequency offset. The other problem is that when the Doppler effect is compensated by the downlink pre-compensation, it is difficult to implement one base station downlink transmission corresponding to multiple UEs reception when the Doppler frequency offset is compensated since the Doppler frequency offsets of different UEs are different because of different moving speeds of different UEs under the base station. The uplink compensation is performed at the transmitter of the UE in the embodiments of the present disclosure, and thus the pressure of performing frequency offset estimation and other processing on the base station side is reduced to the maximum extent, and the demodulation performance of base station reception is improved.

The present disclosure further provides a computer readable storage medium, which is configured to store a program for processing an uplink frequency offset of a communication system. The program for processing an uplink frequency offset of a communication system, when executed by a processor, implements the steps of the method for processing an uplink frequency offset of a communication system as described in the first method embodiment or the second method embodiment.

Figure 6:
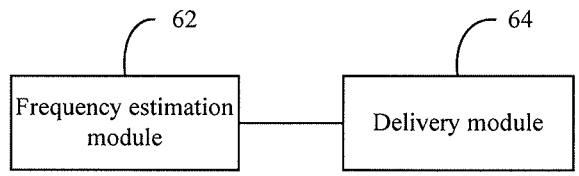
FIG. 6 is a schematic structural diagram of an apparatus for processing an uplink frequency offset of a communication system according to an embodiment of the present application.

Corresponding to the first method embodiment of the present disclosure, an embodiment provides an apparatus for processing an uplink frequency offset of a communication system, and the apparatus is applied to a base station. FIG. 6 is a schematic structural diagram of the apparatus for processing an uplink frequency offset of a communication system according to the first apparatus embodiment of the present disclosure. As shown in FIG. 6, the apparatus for processing an uplink frequency offset of a communication system according to the first apparatus embodiment of the present disclosure includes: a frequency offset estimation module 62 and a delivery module 64.

The frequency offset estimation module 62 is configured to demodulate a random access message sent by a terminal to obtain an initial Doppler frequency offset of the terminal.

The delivery module 64 is configured to deliver the initial Doppler frequency offset to the terminal.

The frequency offset estimation module 62 is further configured to receive an uplink subframe signal sent by the terminal, estimate a residual Doppler frequency offset of the terminal in uplink, and obtain a frequency retuning amount according to the residual Doppler frequency offset.

The delivery module 64 is further configured to deliver the frequency retuning amount to the terminal.

The frequency offset estimation module 62 is specifically configured to: add the initial Doppler frequency offset to the residual Doppler frequency offset to obtain an absolute frequency retuning amount of the terminal; or use the residual Doppler frequency offset as a relative frequency retuning amount of the terminal.

Specifically, the absolute frequency retuning amount is sent to the UE through a MAC RAR or a frequency retuning command MAC control element; or the residual Doppler frequency offset $\theta_{M,n}$ (also referred to as the relative frequency retuning amount) is sent to the UE through a frequency retuning command MAC control element carried by a MAC PDU.

Figure 7:
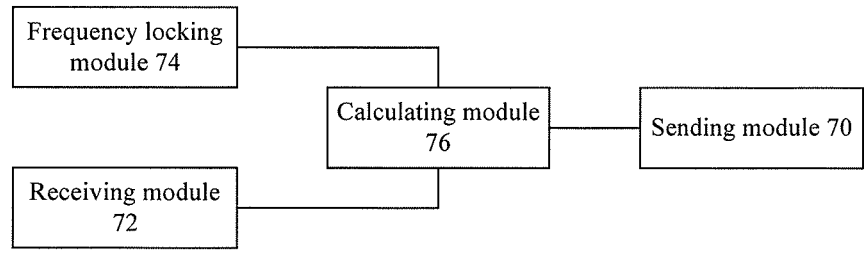
FIG. 7 is a schematic structural diagram of an apparatus for processing an uplink frequency offset of a communication system according to another embodiment of the present application.

Corresponding to the second method embodiment of the present disclosure, an embodiment provides an apparatus for processing an uplink frequency offset of a communication system, and the apparatus is applied to a terminal. FIG. 7 is a schematic structural diagram of the apparatus for processing an uplink frequency offset of a communication system according to the second apparatus embodiment of the present disclosure. As shown in FIG. 7, the apparatus for processing an uplink frequency offset of a communication system according to the first apparatus embodiment of the present disclosure includes: a sending module 70, a receiving module 72, a frequency locking module 74, and a calculating module 76.

The sending module 70 is configured to send a random access message to a base station.

The receiving module 72 is configured to receive an initial Doppler frequency offset sent by the base station.

The frequency locking module 74 is configured to lock an initial downlink transmission frequency.

The calculating module 76 is configured to obtain an initial uplink transmission frequency according to the initial downlink transmission frequency and the initial Doppler frequency offset.

The sending module 70 is further configured to send an uplink subframe signal to the base station according to the initial uplink transmission frequency.

The receiving module 72 is further configured to receive a frequency retuning amount sent by the base station.

The calculating module 76 is further configured to obtain a transmission frequency of a next uplink transmission according to the frequency retuning amount.

The sending module 70 is further configured to send the uplink subframe signal to the base station according to the transmission frequency of the next uplink transmission.

Specifically, when the initial uplink transmission frequency is obtained according to the initial downlink transmission frequency and the initial Doppler frequency offset, the calculating module 76 is configured to perform the operations described below.

For FDD, the initial downlink transmission frequency, the initial Doppler frequency offset, and the duplex spacing are added together to obtain the initial uplink transmission frequency.

For TDD, the initial downlink transmission frequency and the initial Doppler frequency offset are added together to obtain the initial uplink transmission frequency.

In an embodiment, to obtain the transmission frequency of the next uplink transmission according to the frequency retuning amount, the calculating module 76 is specifically configured to perform the operations described below.

When the frequency retuning amount is an absolute frequency retuning amount, the transmission frequency of the next uplink transmission is obtained according to the initial downlink transmission frequency and a current absolute frequency retuning amount.

When the frequency retuning amount is a relative frequency retuning amount, the transmission frequency of the next uplink transmission is obtained according to a current transmission frequency of the downlink and a current relative frequency retuning amount.

In an embodiment, to obtain the transmission frequency of the next uplink transmission according to the initial downlink transmission frequency and the current absolute frequency retuning amount, the calculating module 76 is configured to perform the operations described below.

For FDD, the initial downlink transmission frequency, the current absolute frequency retuning amount, and the duplex spacing are added together to obtain the transmission frequency of the next uplink transmission.

For TDD, the initial downlink transmission frequency and the current absolute frequency retuning amount are added together to obtain the transmission frequency of the next uplink transmission.

In an embodiment, to obtain the transmission frequency of the next uplink transmission according to the current transmission frequency of the downlink and the current relative frequency retuning amount, the calculating module 76 is configured to perform the operations described below.

For FDD, the current transmission frequency of the downlink, the current relative frequency retuning amount, and the duplex spacing are added together to obtain the transmission frequency of the next uplink transmission.

For TDD, the current transmission frequency of the downlink and the relative frequency retuning amount are added together to obtain the transmission frequency of the next uplink transmission.

In the apparatus for processing an uplink frequency offset of a communication system according to the second apparatus embodiment of the present disclosure, before the calculating module obtains the transmission frequency of the next uplink transmission according to the current transmission frequency of the downlink and the current relative frequency retuning amount, the frequency locking module 74 is further configured to lock the current transmission frequency of the downlink.

The apparatus for processing an uplink frequency offset of the a communication system provided by the present application solves two problems. One problem is that the frequency offset compensation algorithm used by the receiver of the base station is beyond the frequency offset estimation capability of the receiver of the base station when the Doppler frequency offset is large, causing inaccurate estimation of the frequency offset. The other problem is that when the Doppler effect is compensated by the downlink pre-compensation, it is difficult to implement one base station downlink transmission corresponding to multiple UEs reception when the Doppler frequency offset is compensated since the Doppler frequency offsets of different UEs are different because of different moving speeds of different UEs under the base station. The uplink compensation is performed at the transmitter of the UE in the embodiments of the present disclosure, and thus the pressure of performing frequency offset estimation and other processing on the base station side is reduced to the maximum extent, and the demodulation performance of base station reception is improved.

In order to explain in detail the method embodiments and the apparatus embodiments of the present disclosure, the following Examples 1 and 2 are given.

EXAMPLE 1

Figure 8:
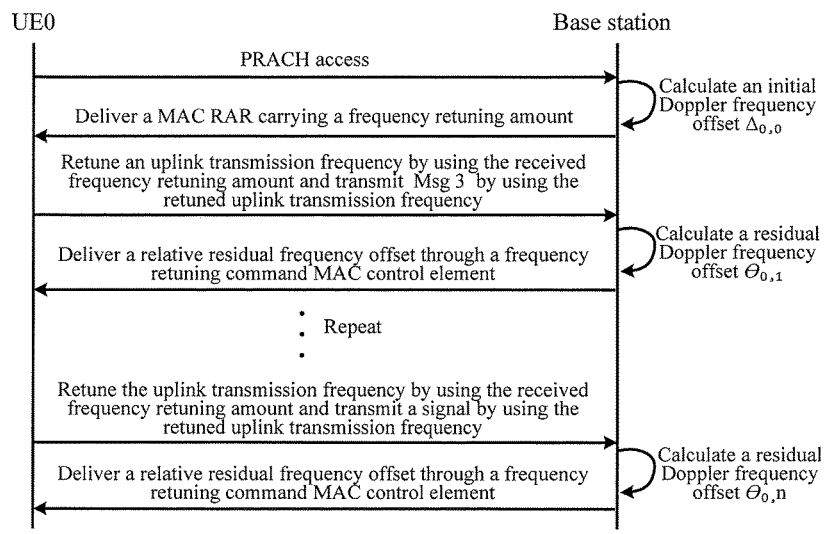
FIG. 8 is a flowchart of absolute frequency retuning in the method for processing an uplink frequency offset of a communication system according to an example 1 of the present application.

In Example 1, a UE0 of N UEs is taken as an example to describe the absolute retuning of the uplink frequency offset. FIG. 8 is a flowchart of the absolute retuning in the method for processing an uplink frequency offset of a communication system according to the example 1 of the present disclosure. As shown in FIG. 8, the absolute retuning includes steps 1 to 10.

In step 1: The UE0 sends a Physical Random Access Channel (PRACH) in a random access phase.

In step 2: A base station demodulates the PRACH of the UE0 to obtain the frequency offset retuning amount $\Delta_{0,0}$ of the UE0.

In step 3: The base station delivers the frequency offset retuning amount $\Delta_{0,0}$ to the UE0 through the MAC RAR.

In step 4: The UE0 retunes the initial uplink transmission frequency and transmits the uplink subframe signal. For FDD and TDD, the initial uplink transmission frequency is calculated respectively according to the following formulas.

$$f_{UL}^{0,1} = f_{DL} + \Delta_{0,0} + \beta \qquad \text{For FDD;}$$

$$f_{UL}^{0,1} = f_{DL} + \Delta_{0,0} \qquad \text{For TDD.}$$

In step 5: The base station receives the uplink subframe signal of the UE0, and calculates the residual frequency offset $\theta_{0,1}$ of the UE0 in the process.

In step 6: The base station calculates an absolute accumulated frequency offset retuning amount $\Delta_{0,0} + \theta_{0,1}$ of the UE0, and delivers the retuning amount to the UE through a frequency retuning command MAC control element.

In step 7: The UE0 receives the absolute frequency retuning amount $\Delta_{0,0} + \theta_{0,1}$, and calculates, in combination with the initial downlink transmission frequency $f_{DL}$, the transmission frequency $f_{UL}^{0,2}$ of the next uplink transmission according to the following equations respectively for FDD and TDD.

$$f_{UL}^{0,2} = f_{DL} + \Delta_{0,0} + \theta_{0,1} + \beta \qquad \text{For FDD;}$$

$$f_{UL}^{0,2} = f_{DL} + \Delta_{0,01} + \theta_{0,1} \qquad \text{For TDD.}$$

When performing data service, the UE repeats the above steps.

In step 8: The base station receives the uplink subframe signal of the UE0, and calculates the residual frequency offset $\theta_{0,n}$ of the UE0 in the process.

In step 9: The base station calculates the absolute accumulated frequency offset retuning amount $\Delta_{0,0}+\theta_{0,n}$ of the UE0, and delivers the retuning amount to the UE through the frequency retuning command MAC control element.

In step 10: The UE0 receives the absolute frequency retuning amount $\Delta_{0,0}+\theta_{0,n}$, and calculates, in combination with the initial downlink transmission frequency $f_{DL}$, the transmission frequency $f_{UL}^{0,n+1}$ of the next uplink transmission according to the following equations respectively for FDD and TDD.

$$f_{UL}^{0,n+1}=f_{DL}+\Delta_{0,0}+\theta_{0,n}+\beta \quad \text{For FDD;}$$

$$F_{UL}^{0,n+1}=f_{DL}+\Delta_{0,0}+\theta_{0,n} \quad \text{For TDD.}$$

The calculation process of other UEs is completely similar to the calculation process of the UE0.

EXAMPLE 2

Figure 9:
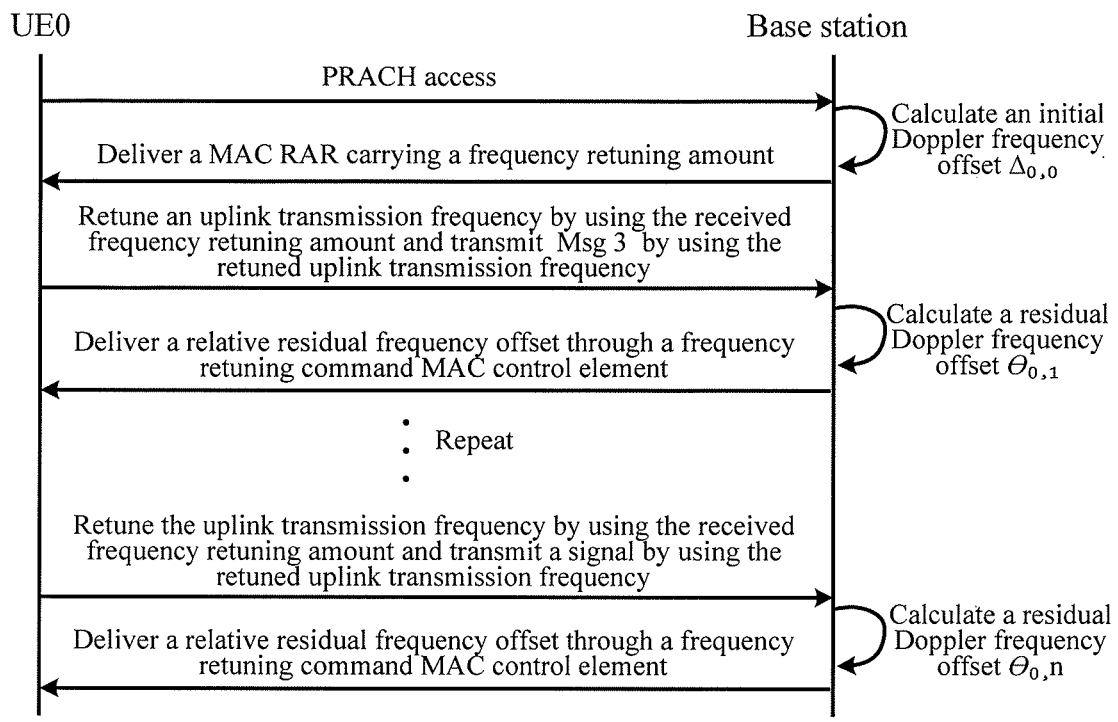
FIG. 9 is a flowchart of relative frequency retuning in the method for processing an uplink frequency offset of a communication system according to an example 2 of the present application.

A UE0 of N UEs is taken as an example to describe the relative retuning of the uplink frequency offset. FIG. 9 is a flowchart of the relative retuning in the method for processing an uplink frequency offset of a communication system according to the example 2 of the present disclosure. As shown in FIG. 9, the relative retuning includes steps 1 to 10.

In step 1: The UE0 sends a PRACH in a random access phase.

In step 2: The base station demodulates the PRACH of the UE0 to obtain the frequency offset retuning amount $\Delta_{0,0}$ of the UE0.

In step 3: The base station delivers the frequency offset retuning amount $\Delta_{0,0}$ to the UE0 through a MAC RAR.

In step 4: The UE0 retunes the initial uplink transmission frequency and transmits the uplink subframe signal. For FDD and TDD, the initial uplink transmission frequency is calculated respectively according to the following formulas.

$$f_{UL}^{0,1}=f_{DL}+\Delta_{0,0}+\beta \quad \text{For FDD;}$$

$$f_{UL}^{0,1}=f_{DL}+\Delta_{0,0} \quad \text{For TDD.}$$

In step 5: The base station receives the uplink subframe signal of the UE0, and calculates the residual frequency offset $\theta_{0,1}$ of the UE0 in the process.

In step 6: The base station delivers the relative frequency retuning amount and the residual Doppler frequency offset $\theta_{0,1}$ to the UE through a frequency retuning command MAC control element.

In step 7: The UE0 receives the residual Doppler frequency offset $\theta_{0,1}$, and calculates, according to the current downlink transmission frequency $f_{DL}^{0,1}$, the transmission frequency $f_{UL}^{0,2}$ of the next uplink transmission according to the following equations respectively for FDD and TDD.

$$f_{UL}^{0,2}=f_{DL}^{0,1}+\theta_{0,1}+\beta \quad \text{For FDD;}$$

$$f_{UL}^{0,2}=f_{DL}^{0,1}+\theta_{0,1} \quad \text{For TDD.}$$

When performing data service, the UE repeats the above steps.

In step 8: The base station receives the uplink subframe signal of the UE0, and calculates the residual Doppler frequency offset $\theta_{0,n}$ of the UE0 in the process.

In step 9: The base station delivers the relative frequency retuning amount and the residual Doppler frequency offset $\theta_{0,n}$ to the UE through the frequency retuning command MAC control element.

In step 10: The UE0 receives the residual Doppler frequency offset $\theta_{0,n}$, and calculates, according to the current downlink transmission frequency $f_{DL}^{0,n}$, the transmission frequency $f_{UL}^{0,n+1}$ of the next uplink transmission according to the following equations respectively for FDD and TDD.

$$f_{UL}^{0,n+1}=f_{DL}^{0,n}+\theta_{0,n}+\beta \quad \text{For FDD;}$$

$$f_{UL}^{0,n+1}=f_{DL}^{0,n}+\theta_{0,n} \quad \text{For TDD.}$$

The calculation process of other UEs is completely similar to the calculation process of the UE0.

INDUSTRIAL APPLICABILITY

The present disclosure provides a method and apparatus for processing an uplink frequency offset of a communication system. By performing uplink compensation at the terminal, the pressure of performing frequency offset estimation on the base station side is reduced to the maximum extent, and the demodulation performance of the base station can be improved.

What is claimed is:

1. A method for processing an uplink frequency offset of a communication system, applied to a base station, comprising:
   demodulating a random access message sent by a terminal to obtain an initial Doppler frequency offset of the terminal;
   delivering the initial Doppler frequency offset to the terminal;
   receiving an uplink subframe signal sent by the terminal according to an initial uplink transmission frequency which is determined according to an initial downlink transmission frequency and the initial Doppler frequency offset, estimating a residual Doppler frequency offset of the terminal on an uplink according to the uplink subframe signal, and obtaining a frequency retuning amount according to the residual Doppler frequency offset; and
   delivering the frequency retuning amount to the terminal.

2. The method for processing an uplink frequency offset of a communication system of claim 1, wherein obtaining the frequency retuning amount according to the residual Doppler frequency offset comprises:
   adding the initial Doppler frequency offset to the residual Doppler frequency offset to obtain an absolute frequency retuning amount of the terminal; or
   using the residual Doppler frequency offset as a relative frequency retuning amount of the terminal.

3. The method for processing an uplink frequency offset of a communication system of claim 1, wherein the random access message is a Physical Random Access Channel (PRACH).

4. The method for processing an uplink frequency offset of a communication system of claim 1, wherein delivering the initial Doppler frequency offset to the terminal comprises: delivering, by the base station, the initial Doppler frequency offset to the terminal through a multiple access channel random access response (MAC RAR).

5. The method for processing an uplink frequency offset of a communication system of claim 1, wherein delivering the frequency retuning amount to the terminal comprises:

delivering, by the base station, the frequency retuning amount to the terminal through a frequency retuning command MAC control element.

6. A method for processing an uplink frequency offset of a communication system, applied to a terminal, comprising:
after sending a random access message to a base station, receiving an initial Doppler frequency offset sent by the base station;
locking an initial downlink transmission frequency, and obtaining an initial uplink transmission frequency according to the initial downlink transmission frequency and the initial Doppler frequency offset;
sending an uplink subframe signal to the base station according to the initial uplink transmission frequency; and
receiving a frequency retuning amount sent by the base station, obtaining a transmission frequency of a next uplink transmission according to the frequency retuning amount, and sending an uplink subframe signal to the base station.

7. The method for processing an uplink frequency offset of a communication system of claim 6, wherein obtaining the initial uplink transmission frequency according to the initial downlink transmission frequency and the initial Doppler frequency offset comprises:
for a frequency division duplex system, adding the initial downlink transmission frequency, the initial Doppler frequency offset, and a duplex spacing together to obtain the initial uplink transmission frequency; and
for a time division duplex system, adding the initial downlink transmission frequency to the initial Doppler frequency to obtain the initial uplink transmission frequency.

8. The method for processing an uplink frequency offset of a communication system of claim 6, wherein obtaining the transmission frequency of the next uplink transmission according to the frequency retuning amount comprises:
when the frequency retuning amount is an absolute frequency retuning amount, obtaining the transmission frequency of the next uplink transmission according to the initial downlink transmission frequency and a current absolute frequency retuning amount; and
when the frequency retuning amount is a relative frequency retuning amount, obtaining the transmission frequency of the next uplink transmission according to a current transmission frequency of the downlink and a current relative frequency retuning amount.

9. The method for processing an uplink frequency offset of a communication system of claim 8, wherein obtaining the transmission frequency of the next uplink transmission according to the initial downlink transmission frequency and the current absolute frequency retuning amount comprises:
for a frequency division duplex system, adding the initial downlink transmission frequency, the current absolute frequency retuning amount, and the duplex spacing together to obtain the transmission frequency of the next uplink transmission; and
for a time division duplex system, adding the initial downlink transmission frequency to the current absolute frequency retuning amount to obtain the transmission frequency of the next uplink transmission.

10. The method for processing an uplink frequency offset of a communication system of claim 8, wherein obtaining the transmission frequency of the next uplink transmission according to the current transmission frequency of the downlink and the current relative frequency retuning amount comprises:
for a frequency division duplex system, adding the current transmission frequency of the downlink, the current relative frequency retuning amount, and a duplex spacing together to obtain the transmission frequency of the next uplink transmission; and
for a time division duplex system, adding the current transmission frequency of the downlink and the relative frequency retuning amount together to obtain the transmission frequency of the next uplink transmission.

11. An apparatus for processing an uplink frequency offset of a communication system, applied to a base station and comprising a frequency offset estimation module and a delivery module,
wherein the frequency offset estimation module is configured to demodulate a random access message sent by a terminal to obtain an initial Doppler frequency offset of the terminal;
the delivery module is configured to deliver the initial Doppler frequency offset to the terminal;
the frequency offset estimation module is further configured to receive an uplink subframe signal sent by the terminal according to an initial uplink transmission frequency which is determined according to an initial downlink transmission frequency and the initial Doppler frequency offset, estimate a residual Doppler frequency offset of the terminal on an uplink according to the uplink subframe signal, and obtain a frequency retuning amount according to the residual Doppler frequency offset; and
the delivery module is further configured to deliver the frequency retuning amount to the terminal.

12. The apparatus for processing an uplink frequency offset of a communication system of claim 11, wherein the frequency offset estimation module is configured to:
add the initial Doppler frequency offset to the residual Doppler frequency offset to obtain an absolute frequency retuning amount of the terminal; or
use the residual Doppler frequency offset as a relative frequency retuning amount of the terminal.

13. An apparatus for processing an uplink frequency offset of a communication system, applied to a terminal and comprising a sending module, a receiving module, a frequency locking module, and a calculating module;
wherein the sending module is configured to send a random access message to a base station;
the receiving module is configured to receive an initial Doppler frequency offset sent by the base station;
the frequency locking module is configured to lock an initial downlink transmission frequency;
the calculating module is configured to obtain an initial uplink transmission frequency according to the initial downlink transmission frequency and the initial Doppler frequency offset;
the sending module is further configured to send an uplink subframe signal to the base station according to the initial uplink transmission frequency;
the receiving module is further configured to receive a frequency retuning amount sent by the base station;
the calculating module is further configured to obtain a transmission frequency of a next uplink transmission according to the frequency retuning amount; and
the sending module is further configured to send an uplink subframe signal to the base station according to the transmission frequency of the next uplink transmission.

14. The apparatus for processing an uplink frequency offset of a communication system of claim 13, wherein the calculating module is configured to:

for a frequency division duplex system, add the initial downlink transmission frequency, the initial Doppler frequency offset, and a duplex spacing together to obtain the initial uplink transmission frequency; and for a time division duplex system, add the initial downlink transmission frequency to the initial Doppler frequency offset to obtain the initial uplink transmission frequency.

15. The apparatus for processing an uplink frequency offset of a communication system of claim 13, wherein the calculating module is configured to:

upon the frequency retuning amount being an absolute frequency retuning amount, obtain the transmission frequency of the next uplink transmission according to the initial downlink transmission frequency and a current absolute frequency retuning amount; and upon the frequency retuning amount being a relative frequency retuning amount, obtain the transmission frequency of the next uplink transmission according to a current transmission frequency of the downlink and a current relative frequency retuning amount.

16. The apparatus for processing an uplink frequency offset of a communication system of claim 15, wherein the calculating module is configured to:

for a frequency division duplex system, add the initial downlink transmission frequency, the current absolute frequency retuning amount, and the duplex spacing together to obtain the transmission frequency of the next uplink transmission; and for a time division duplex system, add the initial downlink transmission frequency to the current absolute frequency retuning amount to obtain the transmission frequency of the next uplink transmission.

17. The apparatus for processing an uplink frequency offset of a communication system of claim 15, wherein the calculating module is specifically configured to:

for a frequency division duplex system, add the current transmission frequency of the downlink, the current relative frequency retuning amount, and a duplex spacing together to obtain the transmission frequency of the next uplink transmission; and for a time division duplex system, add the current transmission frequency of the downlink and the relative frequency retuning amount to obtain the transmission frequency of the next uplink transmission.

18. A non-transitory computer readable storage medium, storing a program for processing an uplink frequency offset of a communication system, wherein the program for processing an uplink frequency offset of a communication system, when executed by a processor, implements a method for processing an uplink frequency offset of a communication, wherein the method for processing an uplink frequency offset of a communication comprises:

demodulating a random access message sent by a terminal to obtain an initial Doppler frequency offset of the terminal;

delivering the initial Doppler frequency offset to the terminal;

receiving an uplink subframe signal sent by the terminal according to an initial uplink transmission frequency which is determined according to an initial downlink transmission frequency and the initial Doppler frequency offset, estimating a residual Doppler frequency offset of the terminal on an uplink according to the uplink subframe signal, and obtaining a frequency retuning amount according to the residual Doppler frequency offset; and delivering the frequency retuning amount to the terminal.

* * * * *